United States Patent [19]

Aosaki et al.

[11] Patent Number: 4,980,776

[45] Date of Patent: Dec. 25, 1990

[54] ELECTRONIC COPYING MACHINE HAVING A LINE SENSOR IN WHICH THE CHARGE STORAGE TIME IS SET BASED ON IMAGE SIGNALS OF THE PREVIOUS SCAN LINE

[75] Inventors: Ko Aosaki; Yasuhiro Nishitani, both of Tokyo, Japan

[73] Assignee: Fuji Photo Film Co., Ltd., Kanagawa, Japan

[21] Appl. No.: 502,879

[22] Filed: Apr. 2, 1990

[30] Foreign Application Priority Data

Mar. 31, 1989 [JP] Japan .................................. 1-83745

[51] Int. Cl.⁵ ...................... H04N 1/028; H04N 3/15; H04N 5/335; B41J 2/32; G01D 15/10
[52] U.S. Cl. ................................ 358/296; 358/213.19; 358/483; 358/494; 346/76 PH
[58] Field of Search ............... 358/296, 474, 482, 483, 358/494, 497, 213.19, 228, 909; 346/76 PH

[56] References Cited

U.S. PATENT DOCUMENTS

| | | | |
|---|---|---|---|
| 4,471,228 | 9/1984 | Nishizawa . | |
| 4,634,885 | 1/1987 | Inoue | 358/213.19 |
| 4,635,126 | 1/1987 | Kinoshita | 358/213.19 |
| 4,651,226 | 3/1987 | Motoori | 358/213.19 |
| 4,809,061 | 2/1989 | Suzuki . | |
| 4,839,735 | 6/1989 | Kyomasu | 358/213.19 |
| 4,843,474 | 6/1989 | Suzuki | 358/213.19 |
| 4,890,166 | 12/1989 | Kimura | 358/228 |

Primary Examiner—Bruce A. Reynolds
Assistant Examiner—Scott A. Rogers
Attorney, Agent, or Firm—Young & Thompson

[57] ABSTRACT

An electronic copying machine has an image line sensor whose charge storage time is controlled individually for each line of the image such that the charge storage time for the next line is determined according to the average detected brightness of the line immediately preceding that next line, based on the image signals thereof.

6 Claims, 4 Drawing Sheets

ELECTRONIC COPYING MACHINE HAVING A LINE SENSOR IN WHICH THE CHARGE STORAGE TIME IS SET BASED ON IMAGE SIGNALS OF THE PREVIOUS SCAN LINE

FIELD OF THE INVENTION

The present invention relates to an electronic copying machine for making a hard copy of a remote surface such as a writing board.

BACKGROUND OF THE INVENTION

Electronic copying machines capable of making a hard copy of notes, illustrations or the like written on a writing board itself or on a sheet placed on or tacked to the writing board are known, wherein an image line sensor (hereinafter referred to simply as a line sensor) moves stepwise in a transverse direction in the focal plane of a taking lens to scan an image formed by the taking lens and to generate at each step image signals representative of a line of pixels of the image, based on which a printer prints out the image on a thermographic or other type copy paper sequentially from line to line. The line sensor has a great number of pixels arranged in a line for photoelectrically converting incident light into signal charges and storing the signal charges, and a shift register for transferring the signal charges as serial image signals.

Before picking up the image by the line sensor in such a conventional electronic copying machine, an average brightness of the whole surface to be printed is detected by a photosensor disposed at the front of the electronic copying machine; and according to the average brightness the charge storage time of the line sensor is adjusted so as to control the exposure for making a good copy.

If, however, an image to be printed has very bright or dark areas, for example if an image is bright on the right side and dark on the left side, then the charge storage time determined in accordance with the detected average brightness of the whole surface would be too long for the bright area and too short for the dark area, resulting in a hard copy of poor quality.

OBJECT OF THE INVENTION

An object of the invention is therefore to provide an electronic copying machine in which the charge time of the line sensor can be properly determined for any image.

SUMMARY OF THE INVENTION

To achieve the above object, an electronic copying machine of the present invention is provided with a charge storage time setting means for setting the charge storage time of a line sensor individually for each line of an image such that the charge storage time for the next line is determined based on the average brightness of the line immediately preceding that next line.

BRIEF DESCRIPTION OF THE DRAWINGS

Other objects and advantages of the present invention will become apparent from the following detailed description when read in conjunction with the accompanying drawings, wherein.

DETAILED DESCRIPTION OF THE PREFERRED EMBODIMENT

Figure 1:
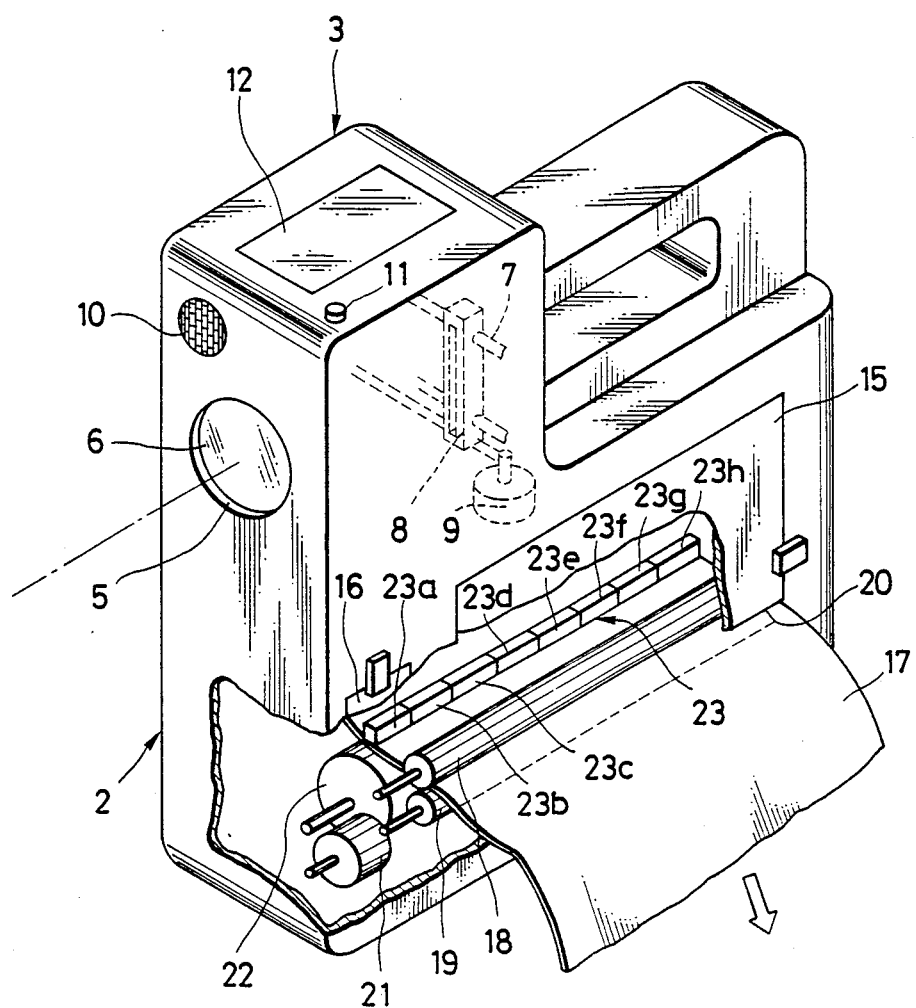
FIG. 1 is a partially broken away perspective view of an electronic copying machine according to a preferred embodiment of the invention.

Referring to FIG. 1, in an upper front portion of a housing 2 of an electronic copying machine of the invention, there is formed a camera section 3. The camera section 3 has an exposure opening 5 in its front wall in which a taking lens 6 is secured. As schematically shown by dashed lines, a line sensor 8 such as a CCD (charge coupled device) type solid state imaging device is disposed in the focal plane of the taking lens 6 in the camera section 3. The line sensor 8 is driven by a pulse motor 9 to slide stepwise along a pair of horizontally parallel guide shafts 7. The line sensor 8 photoelectrically converts the image formed in the focal plane of the taking lens 6 into image signals from line to line.

On the front wall of the camera portion 3, there is further provided an ultrasonic oscillator 10 of an ultrasonic autofocus device which generates ultrasonic waves forwardly upward at an angle of approximately 10° relative to the optical axis of the taking lens 23 and receives the ultrasonic waves reflected by a subject, e.g. the surface of a writing board to measure the distance between the copying machine and the writing board. Furthermore, a start button 11 and a finder window 12 are provided in the top wall of the camera portion 3.

In one side wall of the housing 2 is provided a door 15, and a door 16 which is smaller in size than the door 15. Inside the door 15 is disposed a thermographic paper 17 on which the image of the field viewed through the finder window 12 can be printed by a thermal printing head 23. The thermographic paper 17 is transported by a pair of feed rollers 18 and 19 to be fed out through a slot formed in the side wall along the lower edge of the door 15. The feed rollers 18 and 19 are driven by a pulse motor 21 through gears (not shown), which also drives a platen 22 through gears (not shown). The thermographic paper 17 is transported between the platen 22 and the thermal printing head 23 while being printed with an image. The thermal printing head 23 consists of a great number of aligned resistance heating elements 23. These heating elements are grouped in eight groups designated 23a–23h in FIG. 1. The door 16 is provided for accessing a control portion having a power switch, a print mode switch, a density control switch and so forth, none of which is shown.

Figure 2:
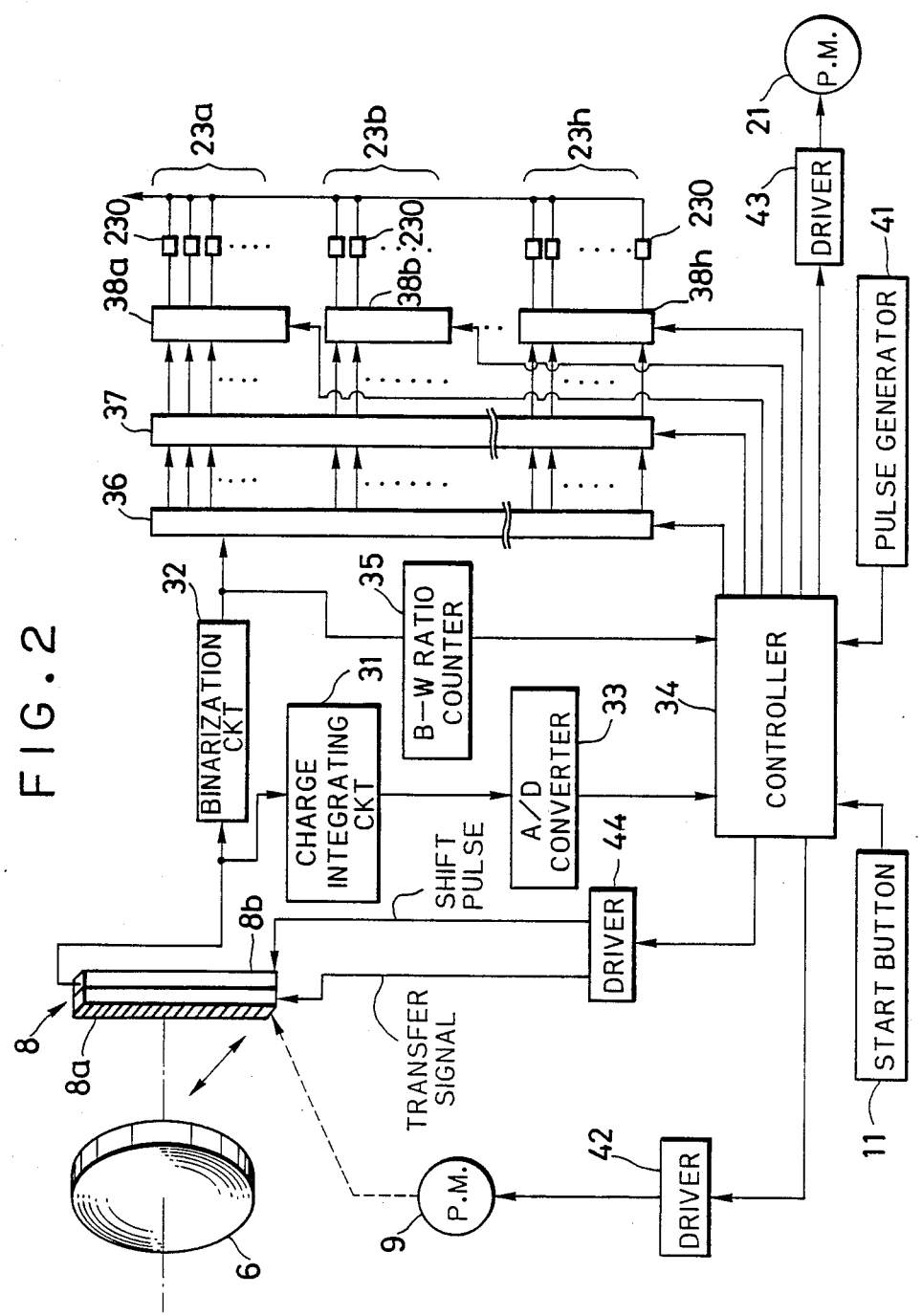
FIG. 2 is a block diagram, partly pictorial and partly schematic, of the circuitry incorporated in the electronic copying machine of FIG. 1.

Referring now to FIG. 2 showing an embodiment of the circuitry of the electronic copying machine of the invention, the line sensor 8 disposed in the focal plane of the taking lens 6 consists of an image sensing section 8a and a shift register 8b. The image sensing section 8a picks up a line of pixels of an image to be printed and converts them into signal charges. Upon receipt of a transfer signal from a driver 44, the shift register 8b begins to transfer the signal charges as a series of analog image signals to a charge integration circuit 31 and a binarization circuit 32 in synchronism with shift pulses supplied at a constant frequency from the driver 44. The charge integration circuit 31 integrates the image signals representative of a line of pixels and outputs the integrated value to a controller 34 through an A/D converter 33. The binarization circuit 32 compares the image signals from the shift register 8b with a threshold level to provide binary image signals, which are then sent to a black-white ratio counter 35 and a shift register 36. The black-white ratio counter 35 calculates the ratio of black to white (hereinafter referred to as the B-W ratio) within the binary image signals representative of a line of pixels and sends the B-W ratio data to the controller 34. The shift register 36 converts the serial binary image signals into parallel signals and sends them to a latch circuit 37.

The latch circuit 37 is connected in parallel with eight gate circuits 38a–38h. These gate circuits 38a–38h have a predetermined number of inputs and corresponding outputs which are each independently connected to a heating element 230. The heating elements 230 that are connected to a same gate circuit 38a–38h constitute a same group 23a–23h, respectively. Each heating element group 23a–23h is actuated when the controller 34 outputs a print signal to the corresponding gate circuit 38a–38h.

Figure 3:
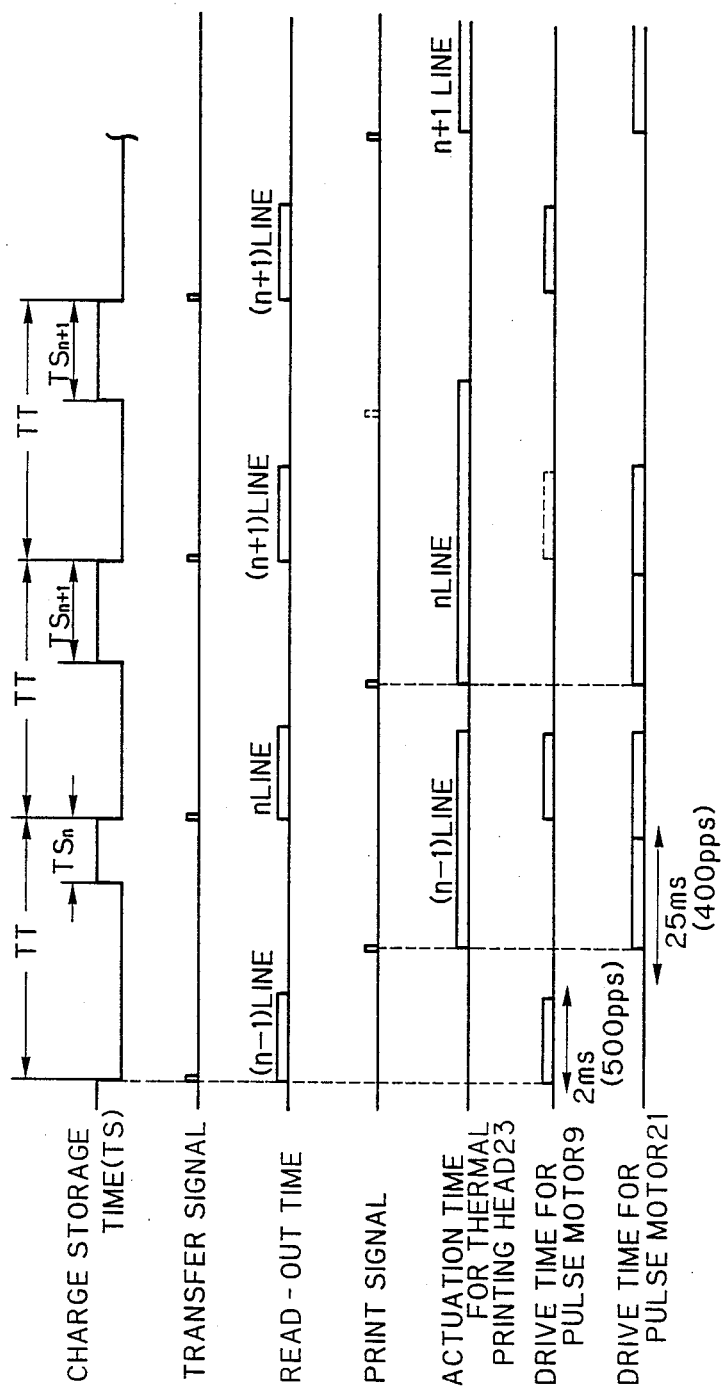
FIG. 3 is a time chart explaining the operation of the embodiment of FIG. 2.

The controller 34 also controls the line sensor 8, the start button 11, the shift register 36, the latch circuit 37, and drivers 42, 43 and 44, in accordance with pulse signals supplied from a pulse generator 41. The driver 42 is connected to the pulse motor 9 for controlling the stepwise scanning movement of the line sensor 8, whereas the driver 43 controls the pulse motor 21. The time chart of the controller 34 is shown in FIG. 3.

Figure 4:
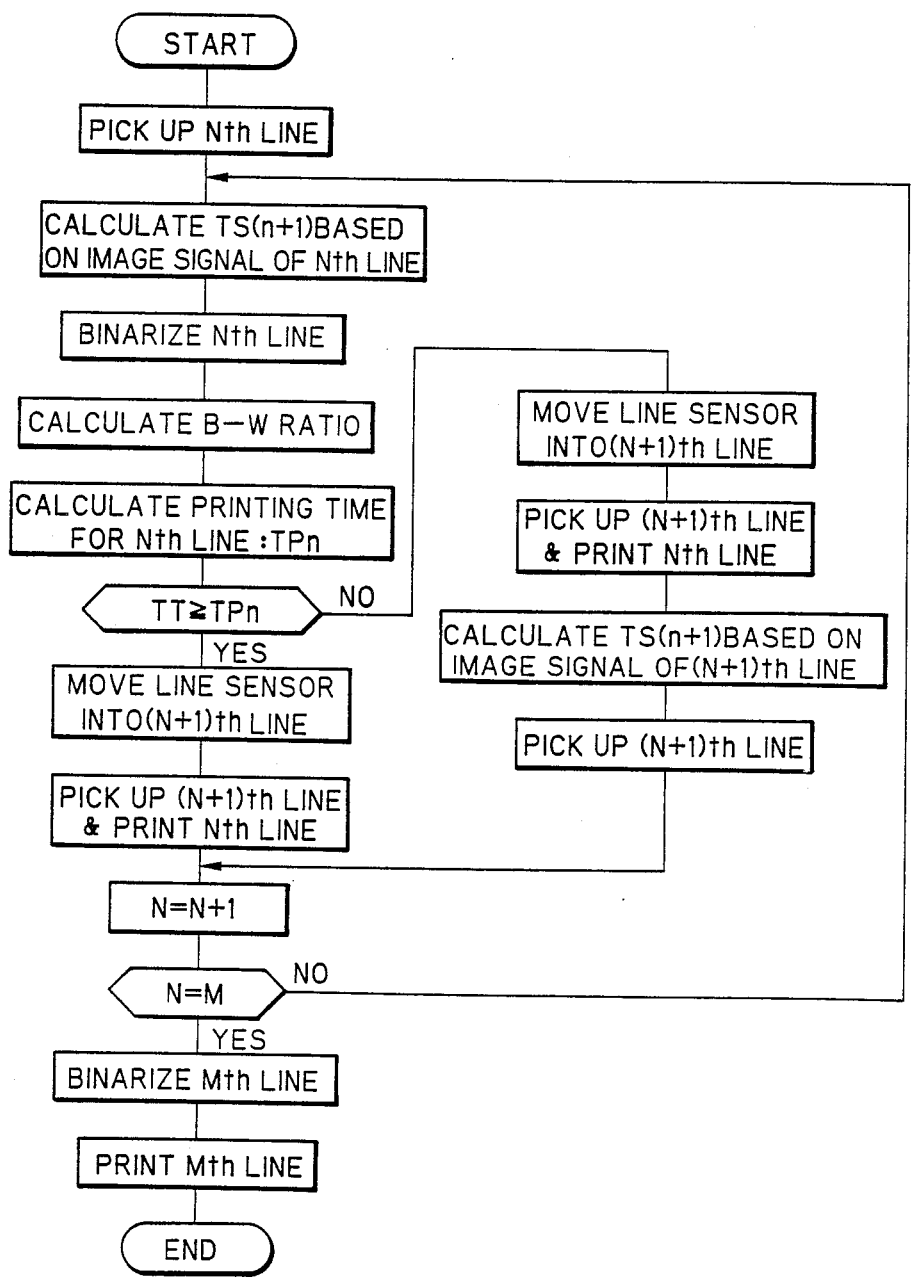
FIG. 4 is a flow chart showing the sequence of operation of the embodiment of FIG. 2.

Next will be described the operation of the above embodiment with reference to FIGS. 3 and 4. To make a hard copy of notes, illustrations or the like written on the writing board itself or on a sheet placed on or tacked to the writing board, the electronic copying machine of the present invention is placed on a table or desk in front of the writing board. The surface of the writing board is viewed through the finder window 12 for framing an area to be copied and then the start button 11 is depressed. Upon depressing the start button 11, a start signal is applied to the controller 34 which then begins to count the pulse signals from the pulse generator 41. When counting up to a predetermined number, the controller 34 causes the line sensor 8 to start the charge storage operation. After a predetermined time for the charge storage, the controller 34 outputs a read-out signal to the driver 44 which then outputs at first a transfer signal to the line sensor 8 upon which signal charges stored in the image sensing section 8a are transferred to the shift register 8b.

Then a predetermined number of shift pulses are supplied from the driver 44 to the shift register 8b as to read out the image signals of the first line and transfer them as serial signals to the charge integrating circuit 31 and the binarization circuit 32. The charge integrating circuit 31 integrates the image signals of the first line so as to calculate the average brightness of the first line and supplies it to the controller 34 through the A/D converter 33. Based on the average brightness of the first line, the controller 34 determines the charge storage time $TS_2$ for the second line. It is to be noted that the charge storage time for the first line is a predetermined constant value $TS_1$.

The binarization circuit 3 transforms the image signals into binary image signals and sends them to the black-white ratio counter 35 and the shift register 36. One level of the binary image signals is a white level which represents a blank space, whereas the other level is a black level which represents a pixel to be printed as a black or colored dot. The black-white ratio counter 35 determines the B-W ratio of the binary image signals of the first lien and outputs the B-W ratio data to the controller 34. The shift register 36 is sequentially supplied with shift pulses from the controller 34 so that the serial binary image signals from the binarization circuit 32 are deserialized and stored in the shift register 36. When all the binary image signals of the first line are inputted into the shift register 36, the controller 34 outputs a latch signal to a latch circuit 37, thereby enabling the thermal printing head 23 to print the first line. Thereafter when the controller 34 outputs the print signal to each of the gate circuits 38a–38h, the heating elements are actuated from group to group, and simultaneously the pulse motor 21 is driven to transport the copy paper.

During reading out the image signals of the first line from the line sensor, the controller 34 causes the driver 42 to drive the pulse motor 9, thereby to move the line sensor 8 to the next scanning line. In this way, the line sensor 8 begins to pick up the second line during the printing of the first line.

On the other hand, the controller 34 also predicts the printing time $TP_1$ necessary for printing the first line based on the B-W ratio detected by the black-white ratio counter 35 and compares the predicted printing time $TP_1$ with a constant time interval TT at which the above-mentioned read-out signal is generated and hence the pickup process of one line is repeated. If $TP_1$ is not longer than TT, even when the first line is not completely printed out, the driver 42 is caused to drive the pulse motor 9 to move the line sensor 8 by one step during the reading out of the image signals of the second line, in the same manner as the line sensor 8 is moved by one step during the reading out of the image signals of the first line. The image signals of the second line are sequentially transferred from the shift register 8b to the charge integrating circuit 31 and the binarization circuit 32 in the same manner as the image signals of the first line. The charge storage time $TS_3$ for the third line is determined based on the average brightness of the image signals of the second line. The binarization circuit 32 also transforms the image signals of the second line into binary image signals which are sent to the shift register 36 and the black-white ratio counter 35. Each time a shift pulse is supplied to the shift register 36, the binary image signals of the first line stored in the shift register 36 are replaced one after another by the binary image signals of the second line. The black-white ratio counter 35 also calculates the B-W ratio of the binary image signals of the second line, based on which the counter 34 predicts the printing time $TP_2$ for the second line, which is compared with the above-mentioned constant time interval TT.

When the binary image signals of the second line are entirely stored in the shift register 36 and also the printing of the first line is completed, the controller 34 outputs a latch signal to the latch circuit 27 to hold the binary image signal of the second line in the latch circuit 27. Thereafter, when the controller 34 outputs the print signal to each of the gate circuits 38a–38h, the heating elements are actuated from group to group, and simultaneously the pulse motor 21 is driven to transport the copy paper. During the printing of the second line, the line sensor 8 begins to pick up the third line. In this way, imaging and printing are repeated from line to line.

If the predicted printing time for the Nth line TPn is longer than the time interval TT, the controller 34 does not drive the driver 42 and hence the pulse motor 9 so that the line sensor 8 stays in the (N+1)th scanning line until the Nth line is completely printed. Even in such a case, the line sensor 8 still executes the imaging process at the predetermined time interval TT, and therefore the line sensor 8 begins to pick up the image signals of the (N+1)th line once again during printing the Nth line. That is, the image signals of the (N+1)th line are twice picked up. The firstly obtained image signals of the (N+1)th line are sent to the charge integrating circuit 31 and the binarization circuit 32 in the same manner as for the foregoing lines. Based on the average brightness of the (N+1)th line detected by the charge integrating circuit 34 and the A/D converter, the controller 34 determines the charge storage time for the next imaging process, that is, in this case, the charge storage time $TS_{(n+1)}$ for picking up the (N+1)th line once more. Accordingly, the second charge storage time for the (N+1)th line is based on the average brightness of the same (N+1)th line.

The firstly detected image signals of the (N+1)th line are also inputted in the shift register 36 and the black-white ratio counter 35 through the binarization circuit 32. But when the predicted printing time TP is longer than the time interval TT, the controller 34 does not output a latch signal and a print signal. Therefore, the first image signals of the (N+1)th line thus stored in the shift register 36 are not used for printing but rather are revised by the secondly detected image signals of the (N+1)th line. Also the data calculated by the black-white ratio counter 35 based on the first image signals are canceled, and the B-W ratio of the (N+1)th line as well as the printing time $TP_{(n+1)}$ therefor are again calculated based on the secondly obtained image signals. Thereafter the controller 34 drives the line sensor 8 and the heating elements 230 in accordance with these renewed data, in the same manner as above.

Assuming that the image to be printed is scanned in M lines, the line sensor 8 picks up the last or Mth line when printing the (M−1)th line. After picking up the Mth line, the line sensor 8 terminates the pickup operation. Accordingly, there is no need to predict and compare the printing time TPm for printing the Mth line with the time interval TT.

As described above, the heating elements 230 of the thermal printing head 23 are actuated from group to group upon a print signal being emitted from the controller 34 to the corresponding gate circuits 38a–38h. When, for example, the gate circuit 38a receives a print signal, then the heating element group 23a is actuated and several heating elements thereof are energized according to the binary image signals latched in the corresponding locations in the latch circuit 37. The sequence of actuation of the heating element groups 23a–23h is determined by the controller 34 depending on the distribution pattern of the black and white level bits in a series of binary image signals representative of a line of pixels. For example, assuming that two of these heating element groups are actuated at a time upon receipt of a printing signal, it is desirable to select a pair of heating element groups: one group has a relatively large number of heating elements to be energized to print black dots and the other has a relatively small number of heating elements to be energized. In this manner, it becomes possible to perform printing effectively while using only a low current. The distribution pattern can be detected based on the B-W ratio data from the black-white ratio counter 35. For this purpose, the black-white ratio counter 35 has, for example, a plurality of sub-counters each of which corresponds to a heating element group 23a–23h.

While the heating elements 230 are actuated in the above-described manner, the controller 34 supplies the driver 43 with a predetermined number of drive pulses upon receipt of which the pulse motor 21 rotates by two steps to revolve the platen 22, thereby transporting the thermographic paper 17 and each line of the image is printed thereon.

As described so far, according to the present invention, an electronic copying machine is provided with a line sensor whose charge storage time is controlled individually for each line according to the average brightness of the immediately preceding line, so that the charge storage time of the line sensor is always properly determined for any image even if part of the image has very bright or very dark areas. Thanks to this high-accuracy exposure control, the electronic copying machine of the present invention can provide a high quality hard copy or print of an image of a remote surface.

The invention has been described in detail with particular reference to a certain preferred embodiment thereof, but it will be understood that variations and modifications can be effected within the spirit and scope of the invention. For example, the thermal printing head may be a thermal ink-transfer recording head used with an ink ribbon for printing an image on ordinary paper.

What is claimed is:

1. An electronic copying machine for making a hard copy of a remote surface, comprising:
   a taking lens for forming an optical image of a remote surface in the focal plane of said taking lens;
   an image line sensor having a line of pixels for photoelectrically converting incident light and storing signal charges, said image line sensor being disposed in said focal plane and being movable in a direction transverse to the optical axis of the taking lens to scan and pick up said optical image, wherein image signals of each line are sequentially read out from said image line sensor after picking up each line;
   means for setting a charge storage time for a next line based on the image signals of a scanning line immediately preceding said next line; and
   an image printing unit including a printing head, said printing head being driven according to said image signals to print an image of said remote surface on a paper for making said hard copy.

2. An electronic copying machine as defined in claim 1, wherein said charge storage time setting means detects an average brightness of said image signals of each line and controls the charge storage time for the next line according to said average brightness.

3. An electronic copying machine as defined in claim 1, wherein said image line sensor is driven by a motor to move stepwise for scanning, and said image printing unit includes a motor for transporting said paper in synchronism with said scanning movement of said image line sensor.

4. An electronic copying machine as defined in claim 3, further comprising:
   means for detecting a black-white level ratio of said image signals for each line;
   means for predicting a printing time necessary for printing a line of said image based on the black-white level ratio of the same line; and means for comparing said predicted printing time with a constant time interval of scanning each line and for controlling the scanning movement of said image line sensor according to a result of this comparison.

5. An electronic copying machine as defined in claim 4, wherein said printing head has a line of recording elements of a same number as said pixels of said image line sensor, said recording elements being grouped into several units and actuated from group to group according to the black-white level pattern of image signals of a line to be printed.

6. An electronic copying machine for making a print of an image recorded on a surface such as writing board, comprising:
 a taking lens for forming an optical image to be printed in the focal plane of said taking lens;
 an image line sensor having a line of pixels for storing signal charges, said image line sensor moving in the focal plane of said taking lens to scan said image, and said stored signal charges being sequentially read out as image signals separated by each scanning line; and
 means for setting a charge storage time of said image line sensor for a next scanning line based on the image signals of a scanning line immediately preceding said next scanning line.

* * * * *